Aug. 6, 1940.  J. E. GRIFFITH  2,210,147
SUPPORT FOR AUTOMOBILE ACCESSORIES
Original Filed July 27, 1936
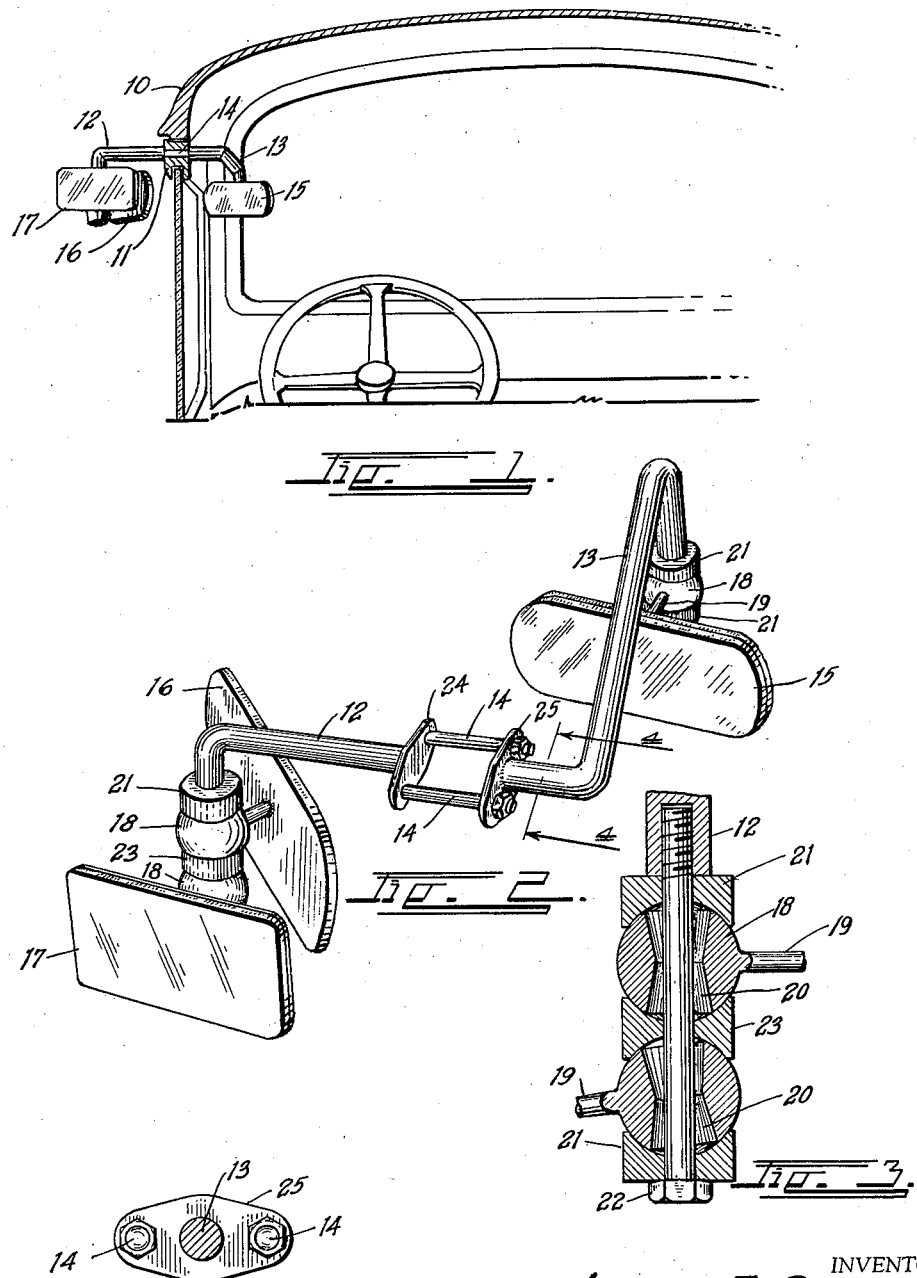
INVENTOR.
JAMES E. GRIFFITH
BY
ATTORNEY.

Patented Aug. 6, 1940

2,210,147

UNITED STATES PATENT OFFICE 2,210,147

SUPPORT FOR AUTOMOBILE ACCESSORIES

James E. Griffith, Denver, Colo.

Original application July 27, 1936, Serial No. 92,819, now Patent No. 2,132,026, dated October 4, 1938. Divided and this application February 21, 1938, Serial No. 191,598

1 Claim. (Cl. 287—12)

This invention relates to a clamping device for attaching rear and forward view mirrors, spot lights, and other automobile accessories to an automobile. It is more particularly designed for supporting a forward view mirror of the type illustrated in applicant's prior application, Ser. No. 92,819, of which this application is a division.

The principal object of the invention is to provide a simple and attractive device which will allow universal movement of a mirror, or other accessory in order that an accurate adjustment thereof may be obtained and which, after the adjustment has been obtained, will rigidly maintain the accessory in the desired position.

Another object to the invention is to provide an attachment device which can be used for attaching a plurality of accessories on the same bracket without requiring changes in the clamping device.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates a combined forward and rear view mirror accessory for an automobile in which the improved clamping device is incorporated.

Fig. 2 is a perspective view of the mirror accessory of Fig. 1.

Fig. 3 is a vertical section through the improved universal clamping device.

Fig. 4 is a sectional view on line 4—4 of Fig. 2.

In the drawing a typical automobile is indicated in section at 10 with its door frame at 11.

The mirror accessory to which the invention is applied in Figs. 1 and 2 consists of an outside arm 12, and an inside arm 13 which are connected together and clamped to the automobile by means of a pair of threaded studs 14. The studs 14 are permanently attached to an elongated plate 24 on one of the arms, for instance the arm 12, and are inserted through a similar plate 25 on the other arm, for instance, the arm 13. When installed, the studs pass through openings in the door frame 11 so that they act to clamp the two arms solidly on opposite sides of the door and to prevent rotation thereof. The inner arm 13 supports a forward view mirror 16 and a rear view mirror 17.

The method of attaching all of these mirrors to their respective arms is similar. Each mirror is provided with a ball 18, attached thereto in any suitable way, such as by means of a bracket arm 19, all of these balls are similar, and each is formed with an opening 20, extending entirely through the ball, these openings are enlarged at the exterior of the ball and reduced at the interior as shown in Fig. 3.

The balls are clamped between a pair of clamping washers 21, which are similar and both contain a convex concavity of a diameter to snugly engage the balls 18. The washers 21 are clamped against the ball 20 by means of a clamp bolt such as indicated at 22. In this particular instance, the clamp bolt is threaded into the extremity of one of the bracket arms.

When a single device is to be supported, the ball is clamped between two of the clamping washers 21, as shown in relation to the mirror 15. When two or more devices are to be supported, a spacing washer 23 is employed which contains a concavity in both of its faces, as shown in Fig. 3. The single clamp bolt 22 clamps the entire assembly together, regardless of how many accessories are attached. Still additional accessories can be attached by using a longer bolt and adding more of the spacing washers 23.

It is desired to call attention to the fact that each accessories can be moved in every direction independently of all the others and that, when the proper place has been reached, the larger contacting surface of the ball serves to rigidly hold them in place.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A device for mounting automobile accessories comprising: an arm; a pair of clamping members, each having a concavity in its face, said concavities facing each other; a ball clamped between said members; means for securing an accessory to said ball; a bolt passing through said members and said ball and threaded at its extremity into said arm to clamp the entire assembly together and to fixedly secure it to said arm; and means for rigidly and fixedly attaching said arms to an automobile.

JAMES E. GRIFFITH.